Patented July 20, 1937

2,087,277

UNITED STATES PATENT OFFICE 2,087,277

PRODUCTION OF PREPARATIONS CONTAINING THE VOLATILE CONSTITUENTS OF VEGETABLE PRODUCTS

Curt Clauss, Meissen, Germany, assignor to Dr. Madaus & Co., Radebeul, Saxony, Germany, a firm No Drawing. Application January 25, 1935, Serial No. 3,391. In Germany August 28, 1934

2 Claims. (Cl. 167—82)

My invention relates to the production of preparations containing the volatile constituents of vegetable products.

Vegetable products have recently been employed for pharmaceutical purposes in a form obtained by the fresh plants being triturated in cane- or milk-sugar and the triturated product being dried in a current of cold air. The object of this known process was to retain all the active constituents in the freshest possible condition. Nevertheless, it has been observed that with this method of operating, the volatile substances do not keep in very satisfactory manner, inasmuch as the ethereal oils, for example, readily volatilize in drying.

This drawback is overcome by the present invention.

I have discovered that the ethereal substances are retained in a substantially better manner in the product that is to be dried, if a sugar is employed which does not have any tendency to crystallize, such as d-mannose, d-fructose and the like. Sugars that have been found particularly suitable for the purpose of my invention are grape sugar, invert sugar, and such mixtures of the same with cane sugar and milk sugar that no longer crystallize. For example, starch sugar is added when cane sugar is employed for the production of a vegetable product.

Example I 5 kgs. of fresh melissa monarda (balm mint) are mechanically mixed with 5 kgs. of grape sugar and disintegrated in a mincing machine, the comminuted mixture being then dried in a current of air at room temperature.

Example II 5 kgs. of fresh peppermint plants are mechanically mixed with 5 kgs. of a mixture of 60% starch sugar and 40% milk sugar, thoroughly minced in a mincing machine and dried in a current of dry air at room temperature.

Example III 10 kgs. of fresh sage plants are mechanically mixed with 10 kgs. of invert sugar, thoroughly minced in a mincing machine and dried in a current of cold air.

Example IV 10 kgs. of fresh Byronia, shredded into coarse slices, are mechanically mixed with 10 kgs. of fruit sugar, thoroughly minced in a mincing machine and dried in a current of cold air.

I claim:—

1. The process of producing preparations containing the volatile constituents of fresh plants, comprising mixing fresh plants with a non-crystallizing sugar, then triturating said mixture, and finally drying the resultant mass.

2. The process of producing preparations containing the volatile constituents of fresh plants, comprising mixing fresh plants with a non-crystallizing sugar, then triturating said mixture, and finally drying the resultant mass in a current of air not exceeding room temperature.

CURT CLAUSS.